US012587109B2

(12) United States Patent
Swamy

(10) Patent No.: US 12,587,109 B2
(45) Date of Patent: Mar. 24, 2026

(54) POWER SUPPLY INCLUDING A RECONFIGURABLE ACTIVE FRONT END CONVERTER

(71) Applicant: MILWAUKEE ELECTRIC TOOL CORPORATION, Brookfield, WI (US)

(72) Inventor: Mahesh M. Swamy, Gurnee, IL (US)

(73) Assignee: Milwaukee Electric Tool Corporation, Brookfield, WI (US)

( * ) Notice: Subject to any disclaimer, the term of this patent is extended or adjusted under 35 U.S.C. 154(b) by 27 days.

(21) Appl. No.: 18/525,677

(22) Filed: Nov. 30, 2023

(65) Prior Publication Data

US 2024/0178763 A1 May 30, 2024

Related U.S. Application Data

(60) Provisional application No. 63/386,703, filed on Dec. 9, 2022, provisional application No. 63/385,421, filed on Nov. 30, 2022.

(51) Int. Cl.
*H02M 7/217* (2006.01)
*H02M 3/155* (2006.01)

(52) U.S. Cl.
CPC ........... *H02M 7/217* (2013.01); *H02M 3/155* (2013.01)

(58) Field of Classification Search
CPC .............................. H02M 7/217; H02M 3/155
See application file for complete search history.

(56) References Cited

U.S. PATENT DOCUMENTS

| | | | | |
|---|---|---|---|---|
| 11,764,584 | B1 * | 9/2023 | Bahei-Eldin | H02J 7/35 307/26 |
| 2013/0155736 | A1 * | 6/2013 | Ilic | H02M 7/72 363/71 |
| 2022/0399751 | A1 * | 12/2022 | Peramsetty | H02M 1/10 |
| 2023/0202320 | A1 * | 6/2023 | Facanha De Oliveira | H02M 3/01 701/22 |
| 2023/0411992 | A1 * | 12/2023 | Peramsetty | H02M 1/10 |
| 2024/0030807 | A1 * | 1/2024 | Messina | H02M 1/4233 |

FOREIGN PATENT DOCUMENTS

WO          2023069679 A1     4/2023

OTHER PUBLICATIONS

Hysolis, "Mobil Power Source MPS3K-4500Wh (120VAC)," User Manual publicly available at least as early as Oct. 27, 2022 (18 pages).

* cited by examiner

*Primary Examiner* — Rexford N Barnie
*Assistant Examiner* — Esayas G Yeshaw
(74) *Attorney, Agent, or Firm* — Michael Best & Friedrich LLP

(57) ABSTRACT

A portable power supply may include an internal power source and a active front-end converter connected to the internal power source. The active front-end converter includes a positive DC connector lead, a negative DC connector lead, a positive source side lead, a negative source side lead, and a plurality of switches. The active front-end converter is configured to operate as a DC-DC converter for DC input signals and an AC-DC inverter for AC input signals. The portable power supply also includes an AC source input, and a DC source input.

14 Claims, 8 Drawing Sheets

*FIG. 4B*

POWER SUPPLY INCLUDING A RECONFIGURABLE ACTIVE FRONT END CONVERTER

RELATED APPLICATIONS

This application claims the benefit of U.S. Provisional Patent Application No. 63/385,421, filed Nov. 30, 2022, and U.S. Provisional Patent Application No. 63/386,703, filed Dec. 9, 2022, the entire content of each of which is hereby incorporated by reference.

SUMMARY

A portable power platform may be powered by a core Li-Ion battery bank. The portable power platform may include an active front end inverter and be configured to power corded tools or use Li-Ion battery pack chargers to charge corresponding battery packs. The portable power platform can be configured to charge 12V, 18V and even 80V battery packs. Generating a healthy 120 VAC or 230 VAC and directly charging an internal power source of the portable power platform may be achieved by using the voltage boosting active front end converter scheme described herein.

Embodiments described herein provide a reconfigurable front end converter that can be configured as DC-DC converter and an AC-DC converter. The active front end converter may be used to boost input voltage from a low voltage source to a DC bus voltage suitable for 180 VDC to 350 VDC applications. Further, the active front end converter may be used to condition input power signals for charging an internal DC power source, and may also be used to condition power drawn from the internal DC power source for external applications.

In some aspects, the techniques described herein relate to a portable power supply including an internal power source; an alternating-current (AC) input, a direct-current (DC) input; an AC output, and an active front-end converter including a bi-directional inverter including a plurality of switches electrically connected to the internal power source, the AC input, the DC input, and the AC output. The active front-end is configured to convert DC power from the internal power source to AC power provided at the AC output in a first configuration, convert AC power from the AC input to DC power for charging the internal power source in a second configuration, and convert DC power at a first voltage level from the DC input to DC power at a second voltage for charging the internal power source in a third configuration.

In some aspects, the techniques described herein relate to an active front end converter including an alternating-current (AC) input, a direct-current (DC) input, an AC output, a DC connector, and an active front-end converter including a bi-directional inverter including a plurality of switches electrically connected to the AC input, the DC input, the AC output, and the DC connector. The active front-end is configured to convert DC power from the DC connector to AC power provided at the AC output in a first configuration, convert AC power from the AC input to DC power provided at the DC connector in a second configuration, and convert DC power at a first voltage level from the DC input to DC power at a second voltage provided at the DC connector in a third configuration.

Before any embodiments are explained in detail, it is to be understood that the embodiments are not limited in their application to the details of the configuration and arrangement of components set forth in the following description or illustrated in the accompanying drawings. The embodiments are capable of being practiced or of being carried out in various ways. Also, it is to be understood that the phraseology and terminology used herein are for the purpose of description and should not be regarded as limiting. The use of "including," "comprising," or "having" and variations thereof are meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings.

In addition, it should be understood that embodiments may include hardware, software, and electronic components or modules that, for purposes of discussion, may be illustrated and described as if the majority of the components were implemented solely in hardware. However, one of ordinary skill in the art, and based on a reading of this detailed description, would recognize that, in at least one embodiment, the electronic-based aspects may be implemented in software (e.g., stored on non-transitory computer-readable medium) executable by one or more processing units, such as a microprocessor and/or application specific integrated circuits ("ASICs"). As such, it should be noted that a plurality of hardware and software-based devices, as well as a plurality of different structural components, may be utilized to implement the embodiments. For example, "servers" and "computing devices" described in the specification can include one or more processing units, one or more computer-readable medium modules, one or more input/output interfaces, and various connections (e.g., a system bus) connecting the components.

Other aspects of the embodiments will become apparent by consideration of the detailed description and accompanying drawings.

BRIEF DESCRIPTION OF THE DRAWINGS

FIG. 4B illustrates a schematic of the front end converter reconfigured to act as an AC-DC inverter as AC power from an AC power source is applied at an input.

DETAILED DESCRIPTION

Figure 1A:
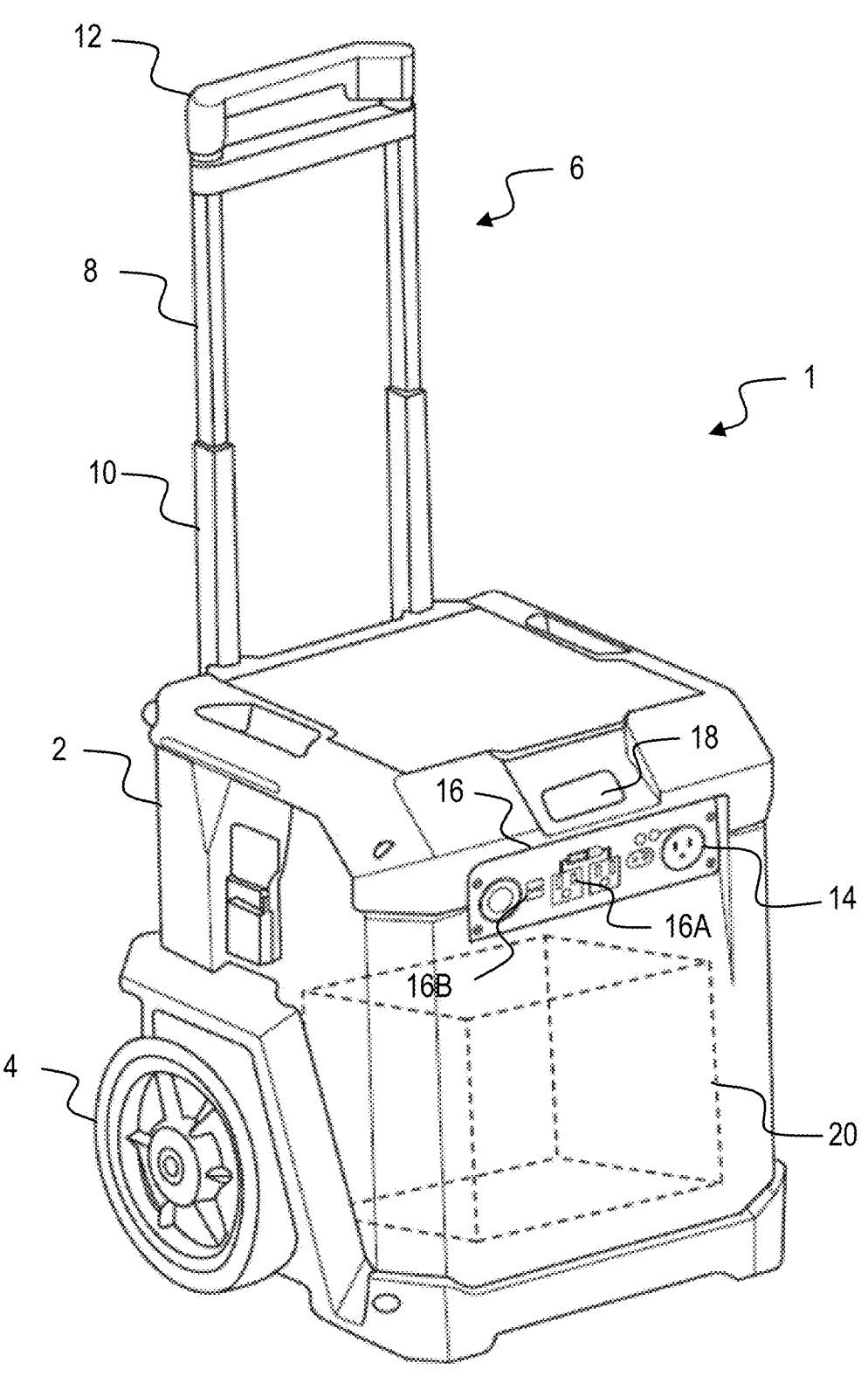
FIG. 1A illustrates a perspective view of a portable power supply device.

Battery powered inverters are desired for converting direct current (DC) power drawn from a battery to power appliances requiring alternating current (AC) power. However, battery packs used as DC sources for such inverters are often charged using AC power. Many uninterruptible power systems provide options to charge an internal battery pack from solar panels, wind turbines, or another DC power source when an AC supply is unavailable for charging. In most such schemes, a DC-AC inverter section for powering AC loads is separate from the charger section, and the DC-AC inverter is a low voltage inverter. These systems are often designed so that the DC-AC inverter is usually operated when the charger is not being operated, and the charger operated when the DC-AC inverter is not being operated. However, hardware can be configured according to the teachings herein to support use in both the charger and inverter functions, depending on the state of charge of the battery. Further, the possible applications of a portable platform increase significantly without significantly adding to the size or cost of those platforms by using the reconfigurable active front end converter described herein to accept DC power from, for example, a solar panel output to charge the battery pack in a portable power platform while also facilitating output power conditioning.

In the active front end converter described herein, an inverter arrangement may be used for both charging the battery pack and for converting DC battery power to AC power for normal use. As will be described in greater detail below, if solar power or wind power is available and no AC power is available for charging the battery pack, the inverter may be reconfigured to allow it to charge the internal battery pack from an external solar power source or other DC source (e.g., other battery sources), provided the voltage available for charging the internal battery pack meets certain requirements.

Such a portable power platform can be achieved by modifying an AC-DC bi-directional inverter to use blocking diodes and contactor arrangements to reconfigure the input section of the AC-DC bi-directional inverter to function as a DC-DC converter. By reconfiguring the input of, for example, a four-switch AC-DC bi-directional inverter, the four-switch inverter topology can be used to boost input DC voltage to a desired DC voltage that can then be used for charging the internal battery pack of a portable power platform. Hence, the reconfiguration allows a bipolar boost converter mode of operation to function as a unipolar boost converter. For reconfiguring the input, a set of contactors may be positioned so that even if AC is accidentally applied at the input during DC to DC charging, it does not cause a fault condition. Similarly, additional contactors prevent accidental application of DC voltage at the input during AC to DC charging. Such interlocking may be used to prevent circuit maloperation.

Additionally, a boost arrangement including inductors and capacitors may be used at the input of the AC-DC bi-directional inverter to adapt to the state of charge of a battery so that the output of the boost arrangement is modulated to the needs of the battery. For example, the output of the boost arrangement version may be fed to the bi-directional inverter reconfigured as an DC-DC converter to match its output to that of a battery pack voltage.

Although embodiments described herein can be applied to, performed by, or used in conjunction with a variety of high-power devices, embodiments are described primarily with respect to an active front end converter including a reconfigurable bi-directional inverter for use with a battery assembly or battery pack.

FIG. 1A illustrates a portable power supply device or power supply 1. The power supply 1 includes, among other things, a housing 2. In some embodiments, the housing 2 includes one or more wheels 4 and a handle assembly 6. In the illustrated embodiment, the handle assembly 6 is a telescoping handle movable between an extended position and a collapsed position. The handle assembly 6 includes an inner tube 8 and an outer tube 10. The inner tube 8 fits inside the outer tube 10 and is slidable relative to the outer tube 10. The inner tube 8 is coupled to a horizontal holding member 12. In some embodiments, the handle assembly 6 further includes a locking mechanism to prevent inner tube 8 from moving relative to the outer tube 10 by accident. The locking mechanism may include notches, sliding catch pins, or another suitable locking mechanism to inhibit the inner tube 8 from sliding relative to the outer tube 10 when the handle assembly 6 is in the extended position and/or in the collapsed position. In practice, a user holds the holding member 12 and pulls upward to extend the handle assembly 6. The inner tube 8 slides relative to the outer tube 10 until the handle assembly 6 locks in the extended position. The user may then pull and direct the power supply 1 by the handle assembly 6 to a desired location. The wheels 4 of the power supply 1 facilitate such movement.

The housing 2 of power supply 1 further includes a power input unit 14, a power output unit 16, and a display 18. The power input unit 14 may include multiple electrical connection interfaces configured to receive power from an external power source. In the embodiment shown, the power input unit 14 is connected to an active front end converter configured to condition AC and DC inputs to charge the internal power source 20 using DC power. In some embodiments, the external power source is a DC power source. For example, the DC power source may be one or more photovoltaic cells (e.g., a solar panel), an electric vehicle (EV) charging station, or any other DC power source. In some embodiments, the external power source is an AC power source. For example, the AC power source may be a conventional wall outlet, such as a 120 V outlet or a 240 V outlet, found in North America. As another example, the AC power source may be a conventional wall outlet, such as a 220V outlet or 230V outlet, found outside of North America. In some embodiments, the power input unit 14 is replaced by or additionally includes a cable configured to plug into a conventional wall outlet. In some embodiments, the power input unit 14 further includes one or more devices, such as antennas or induction coils, configured to wirelessly receive power from an external power source. The power received by the power input unit 14 may be used to charge a core battery, or internal power source 20, disposed within the housing 2 of power supply 1.

The power received by the power input unit 14 may also be used to provide power to one or more devices connected to the power output unit 16. The power output unit 16 includes one more power outlets. In the illustrated embodiment, the power output unit 16 includes a plurality of AC power outlets 16A and DC power outlets 16B. It should be understood that the number of power outlets included in the power output unit 16 is not limited to the power outlets illustrated in FIG. 1A. For example, in some embodiments of the power supply 1, the power output unit 16 may include more or fewer power outlets than the power outlets included in the illustrated embodiment of power supply 1.

In some embodiments, the power output unit 16 is configured to provide power output by the internal power source 20 to one or more peripheral devices. In some embodiments, the power output unit 16 is configured to provide power provided by an external power source directly to one or more peripheral devices. The one or more peripheral devices may be a smartphone, a tablet computer, a laptop computer, a portable music player, a power tool, a power tool battery pack, a power tool battery pack charger, or the like. The peripheral devices may be configured to receive DC and/or AC power from the power output unit 16.

In some embodiments, the DC power outlets 16B include one or more receptacles for receiving and charging power tool battery packs. In such embodiments, power tool battery packs received by, or connected to, the battery pack receptacles 16B are charged with power output by the internal power source 20 and/or power received from the external power source. In some embodiments, power tool battery packs connected to the battery pack receptacles 16B are used to provide power to the internal power source 20 and/or one or more peripheral devices connected to outlets of the power output unit 16. In some embodiments, the power output unit 16 includes tool-specific power outlets. For example, the power output unit may include a DC power outlet used for powering a welding tool.

The display 18 is configured to indicate a state of the power supply 1 to a user, such as state of charge of the internal power source 20 and/or fault conditions. In some embodiments the display 18 includes one or more light-emitting diode ("LED") indicators configured to illuminate and display a current state of charge of internal power source 20. In some embodiments, the display 18 is, for example, a liquid crystal display ("LCD"), a light-emitting diode ("LED") display, an organic LED ("OLED") display, an electroluminescent display ("ELD"), a surface-conduction electron-emitter display ("SED"), a field emission display ("FED"), a thin-film transistor ("TFT") LCD, etc. In other embodiments, the power supply 1 does not include a display.

Figure 1B:
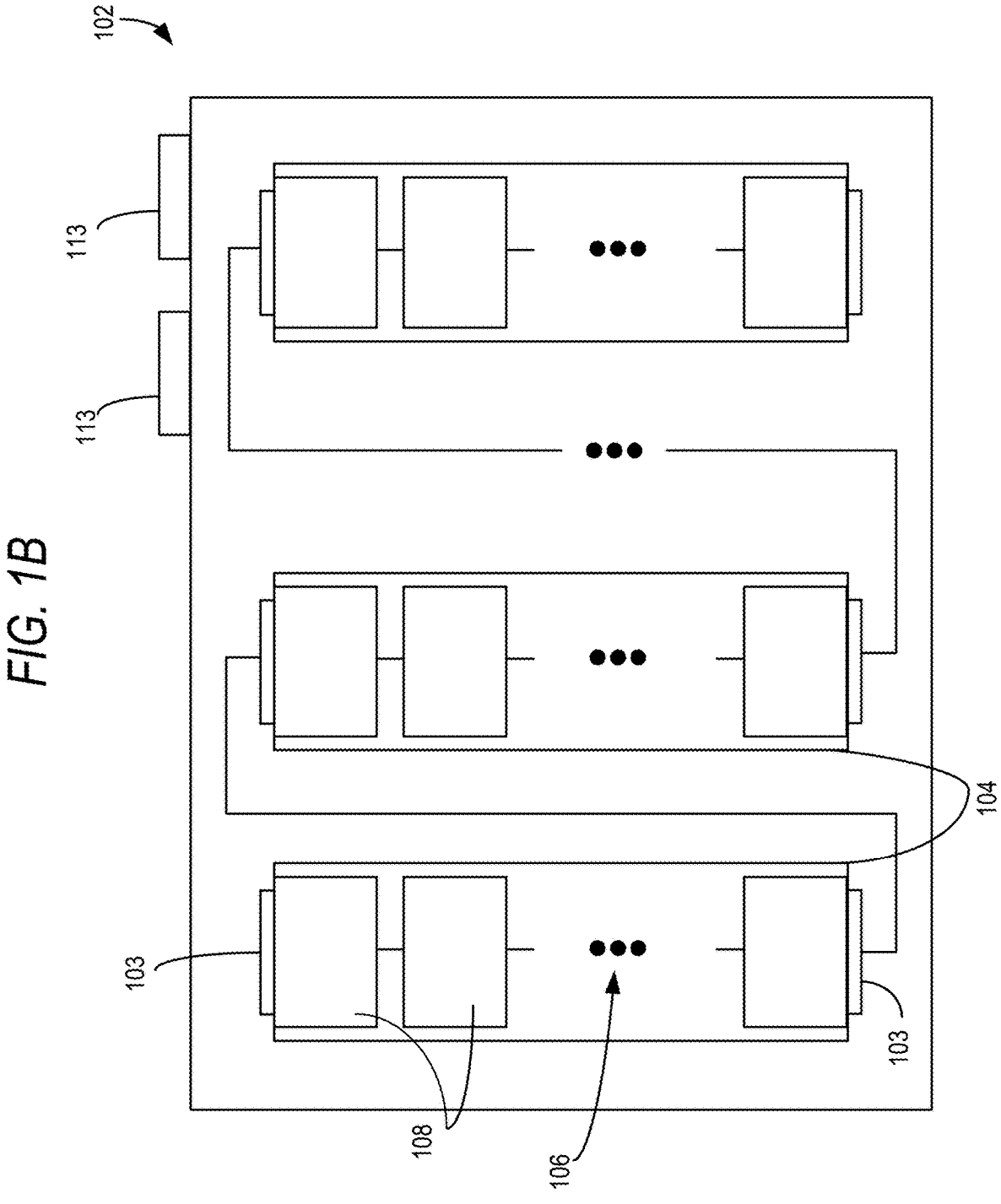
FIG. 1B illustrates a battery assembly including a plurality of battery cells.

FIG. 1B shows a battery pack or battery core 102 including a plurality of battery assemblies 104 connected in series (e.g., internal power source 20 in FIG. 1). The plurality of batteries may vary in quantity from application to application (illustrated in FIG. 1B as an ellipse 106). For example, the battery pack 102 may include 4 batteries, 5 batteries, 10 batteries, etc., connected in series via their terminals 103. Each of the batteries 104 may include a plurality of cells 108. The plurality of cells 108 may vary from application to application (illustrated in FIG. 1B as an ellipses 106). For example, each battery 104 may include 10 cells, 12 cells, 20 cells, etc. The battery pack 102 also includes terminals 113 configured to deliver current to a load (not shown) via a conductor when connected to the load via the conductor.

Figure 2:
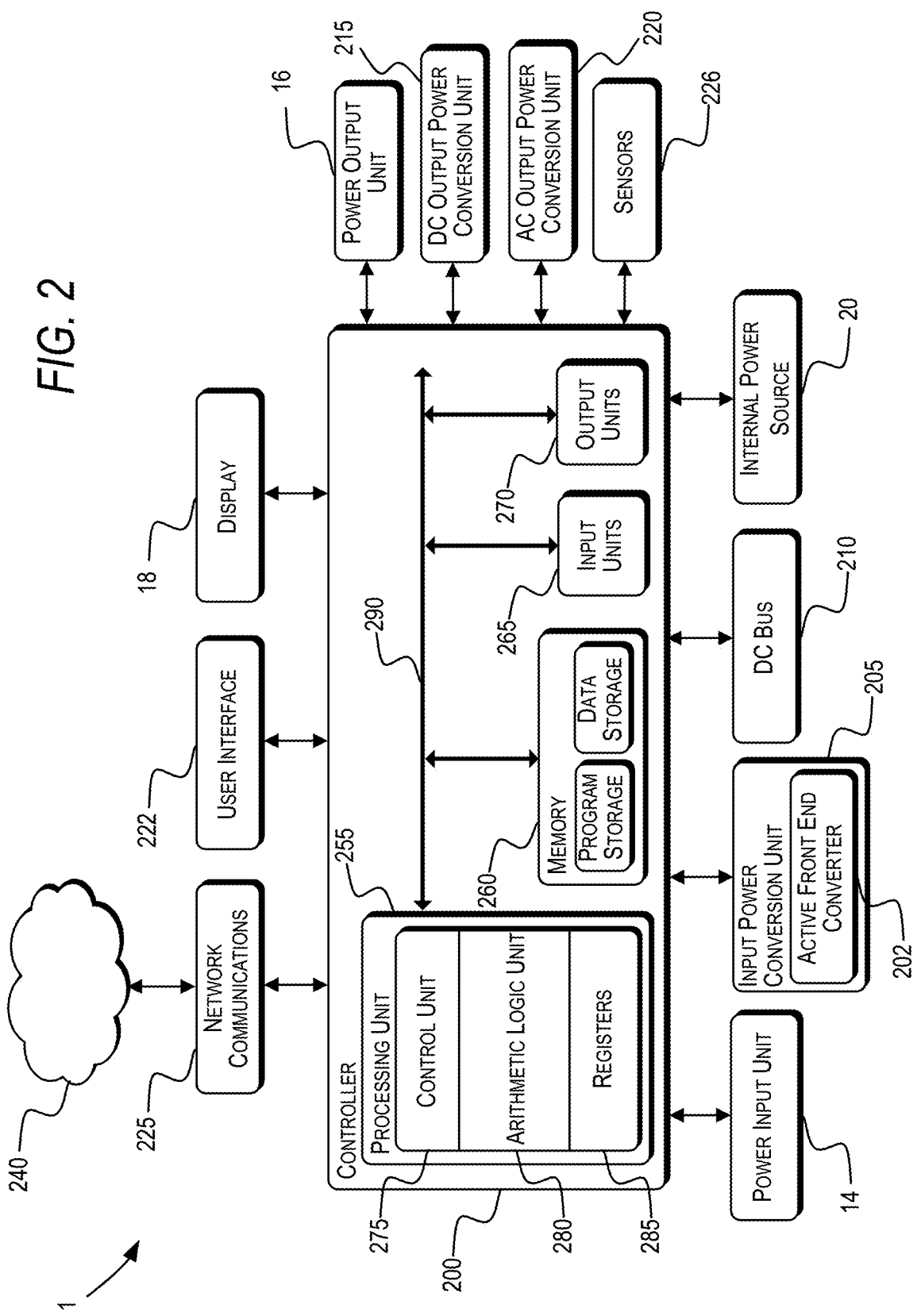
FIG. 2 illustrates a control system for the portable power supply device of FIG. 1 incorporating an active front end converter.

FIG. 2 is a generalized schematic illustration of a controller 200 included in power supply 1. The controller 200 is electrically and/or communicatively connected to a variety of modules or components of the power supply 1. For example, the controller 200 may be connected to the power input unit 14, the power output unit 16, the display 18, and the internal power source 20. Persons skilled in the art will recognize that electrical and/or communicative connections between the controller 200 and the internal power source 20 include electrical and/or communicative connections between the controller 200 and components included in the internal power source 20, such as, but not limited to, the plurality of subcores of the internal power source 20 and components included therein, such as battery cells and subcore monitoring circuits.

The controller 200 is additionally electrically and/or communicatively connected to a an input power conversion unit 205 including an active front end converter 202, a DC bus 210, an AC output power conversion unit 215, a DC output power conversion unit 220, a user interface 222, a network communications module 225, and a plurality of sensors 226.

The network communications module 225 is connected to a network 240 to enable the controller 200 to communicate with peripheral devices in the network, such as a smartphone or a server. The sensors 226 include, for example, one or more voltage sensors, one or more current sensors, one or more temperature sensors, and/or one or more additional sensors used for measuring electrical and/or other characteristics of the power supply 1. Each of the sensors 226 generates one or more output signals that are provided to the controller 200 for processing and evaluation. The user interface 222 is included to provide user control of the power supply 1. The user interface 222 can include any combination of digital and analog input devices required to achieve a desired level of control for the power supply 1. For example, the user interface 222 may include a plurality of knobs, a plurality of dials, a plurality of switches, a plurality of buttons, or the like. In some embodiments, the user interface 222 is integrated with the display 18 (e.g., as a touchscreen display).

The controller 200 includes combinations of hardware and software that are operable to, among other things, control the operation of the power supply 1, communicate over the network 240, receive input from a user via the user interface 222, provide information to a user via the display 18, etc. For example, the controller 200 includes, among other things, a processing unit 255 (e.g., a microprocessor, a microcontroller, an electronic processor, an electronic controller, or another suitable programmable device), a memory 260, input units 265, and output units 270. The processing unit 255 includes, among other things, a control unit 275, an arithmetic logic unit ("ALU") 280, and a plurality of registers 285 (shown as a group of registers in FIG. 2), and is implemented using a known computer architecture (e.g., a modified Harvard architecture, a von Neumann architecture, etc.). The processing unit 255, the memory 260, the input units 265, and the output units 270, as well as the various modules or circuits connected to the controller 200 are connected by one or more control and/or data buses (e.g., common bus 290). The control and/or data buses are shown generally in FIG. 2 for illustrative purposes. Although the controller 200 is illustrated in FIG. 2 as one controller, the controller 200 could also include multiple controllers configured to work together to achieve a desired level of control for the power supply 1. As such, any control functions and processes described herein with respect to the controller 200 could also be performed by two or more controllers functioning in a distributed manner.

The memory 260 is a non-transitory computer readable medium and includes, for example, a program storage area and a data storage area. The program storage area and the data storage area can include combinations of different types of memory, such as a read only memory ("ROM"), a random access memory ("RAM") (e.g., dynamic RAM ["DRAM"], synchronous DRAM ["SDRAM"], etc.), electrically-erasable programmable ROM ("EEPROM"), flash memory, a hard disk, an SD card, or other suitable magnetic, optical, physical, or electronic memory devices. The processing unit 255 is connected to the memory 260 and is configured to execute software instructions that are capable of being stored in a RAM of the memory 260 (e.g., during execution), a ROM of the memory 260 (e.g., on a generally permanent basis), or another non-transitory computer readable medium such as another memory or a disc. Software included in the implementation of the power supply 1 and controller 200 can be stored in the memory 260 of the controller 200. The software includes, for example, firmware, one or more applications, program data, filters, rules, one or more program modules, and other executable instructions. The controller 200 is configured to retrieve from the memory 260 and execute, among other things, instructions related to the control processes and methods described herein. In other embodiments, the controller 200 includes additional, fewer, or different components.

During operation of the power supply 1, the controller 200 is configured to monitor voltage, current, and/or other signals received from the various components described above. For example, the controller 200 is configured to monitor voltage signals received from the internal power source 20 when the internal power source 20 is charged by an external power source connected to the power input unit 14. As another example, the controller 200 is configured to monitor voltage signals received from the internal power source 20 when the internal power source 20 provides power to one or more peripheral devices connected to the power output unit 16. More generally, the controller 200 is configured to monitor and/or control power flow to and from the above-described components of power supply 1 that are electrically or communicatively coupled to the controller 200.

Figure 3:
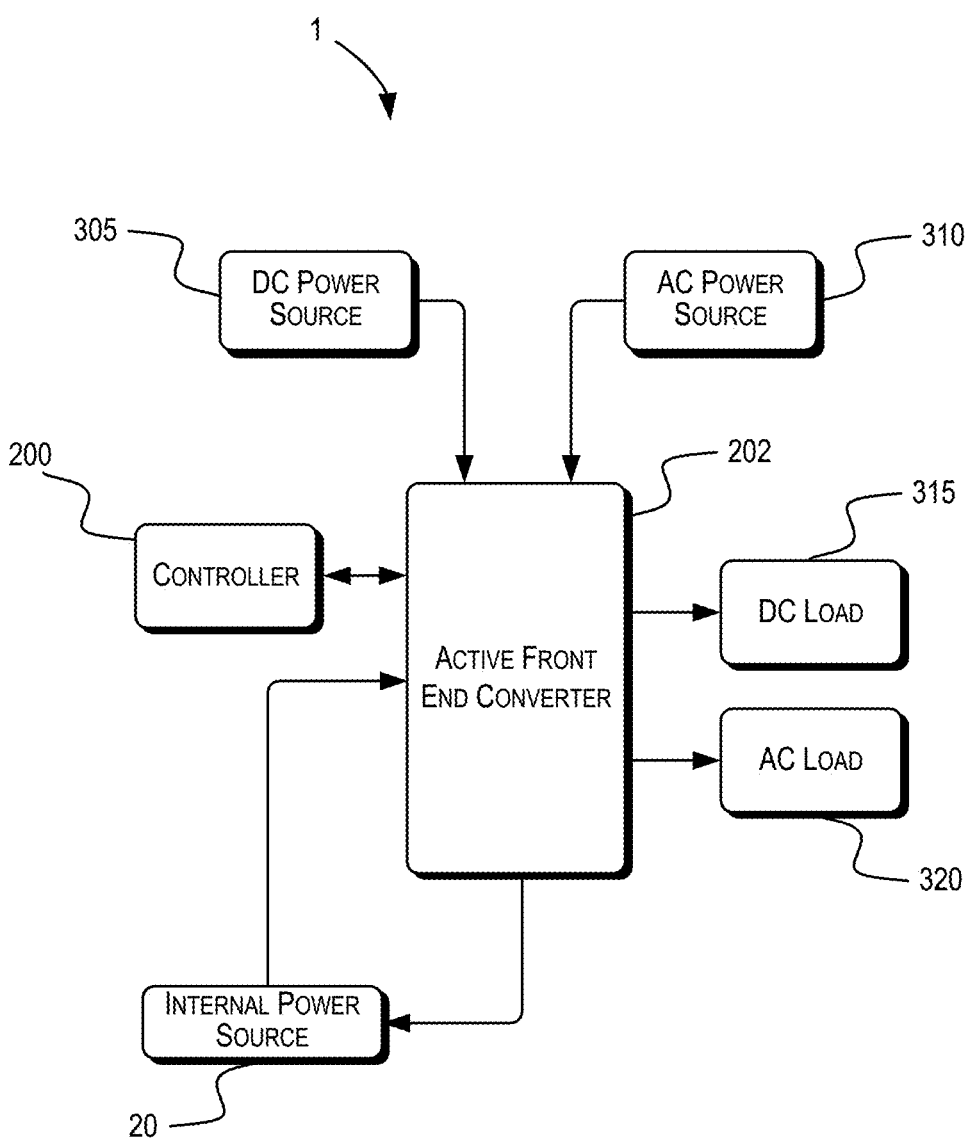
FIG. 3 illustrates a schematic of an active front end converter for the portable power supply device of FIG. 1.

FIG. 3 shows an embodiment of the power supply 1 wherein the active front end converter 202 is used as a power conditioning circuit for both DC power sources 305 and AC power sources 310 connected to the inputs of power supply 1. The active front end converter 202 prioritizes charging the internal power source 20 using AC power from the AC power source 310 by using contactors and blocking diodes to prevent faults when both AC power and DC power are received at the input of the active front end converter 202. For example, a solar panel may be used as a DC power source 305 to provide DC power to the active front end converter 202 for charging the internal power source 20 of the power supply 1. If, while the internal power source 20 is charging in this manner, an AC wall plug is plugged in as the AC power source 310 to provide AC power to the active front end converter 202 for charging the internal power source 20, the active front end converter 202 will be automatically reconfigured to prevent a fault and to prioritize charging the internal power source 20 using the AC power source only. This functionality will be described in greater detail below.

In the embodiment shown, the active front end converter 202 is also used as a power conditioning circuit for both DC loads 315 and AC loads 320 in response to controller 200 manipulating the positions of the internal switches of the active front end converter 202 as needed to properly power a connected load. For example, the controller 200 may reconfigure the active front end converter 202 to act as a DC-DC boost converter to control the voltage of power drawn from the internal power source 20 for powering the DC load 315, or to act as an inverter to convert DC power drawn from the internal power source 20 to AC for powering the AC load 320. The controller 200 may also reconfigure the active front end converter 202 to act as an AC-DC inverter for powering the DC load 315 when an AC power source is received at the front end of the converter. Additionally, in some circumstances, the controller 200 reconfigures the active front end converter 202 to act as a DC-AC buck converter to power AC loads 320. In other cases, the controller reconfigures the active front end converter 202 merely as a passthrough for AC power sources 310 to AC loads 320, or from DC power sources 305 to DC loads 315.

As will be described in further detail below, providing such a reconfigurable active front end converter 202 involves connecting the positive and negative leads of the AC power source 310 to the positive and negative AC power source side leads of a bi-directional inverter, then using the positive and negative AC power source side leads of the bi-directional inverter as a single, unified positive lead of the DC power source 305. A negative DC power source side lead of a DC bus of the active front end converter 202 then functions as the negative lead of the input DC power source 305.

Figure 4A:
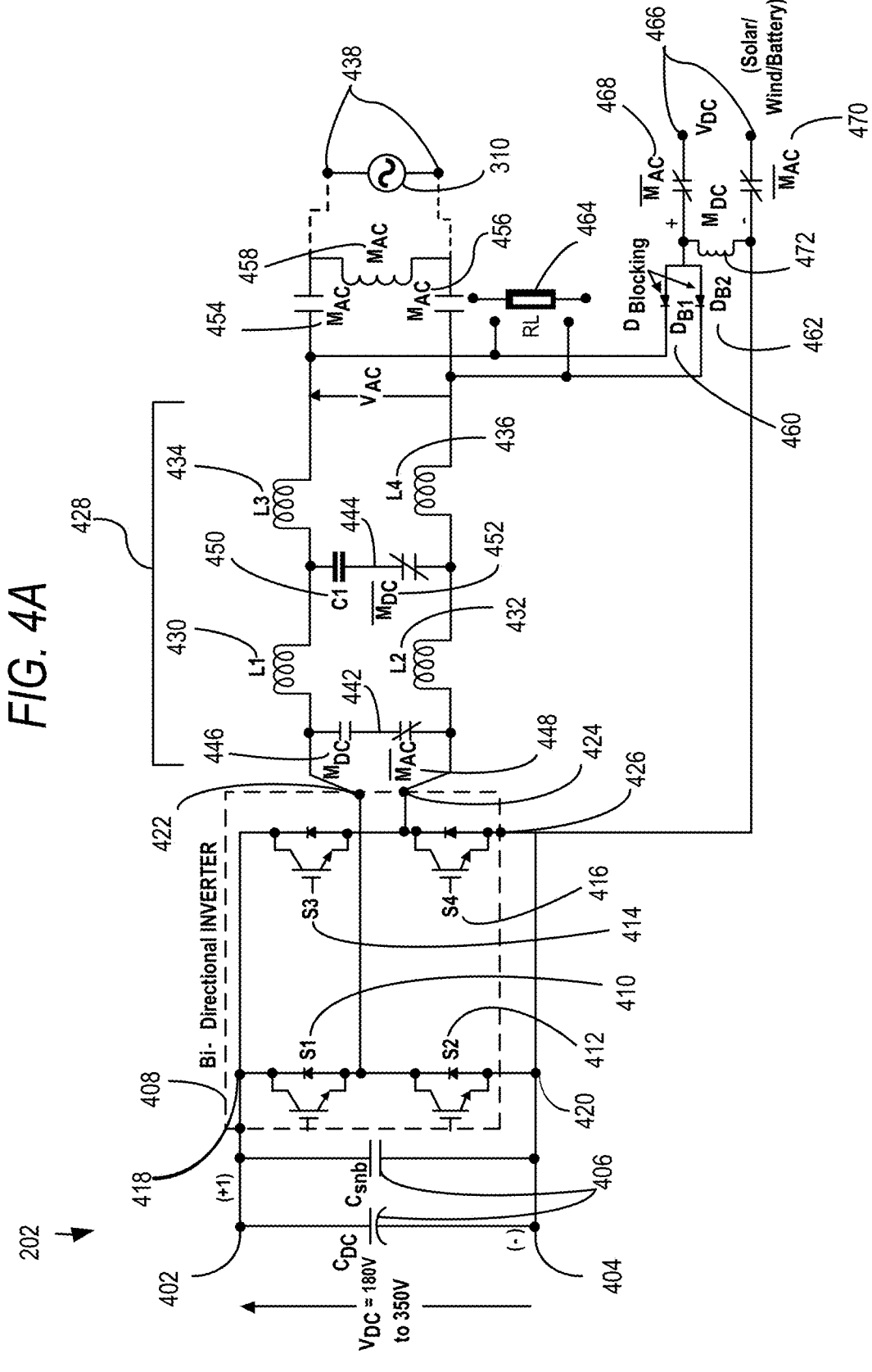
FIG. 4A illustrates a schematic of the active front end converter of FIG. 3.
Figure 4B:
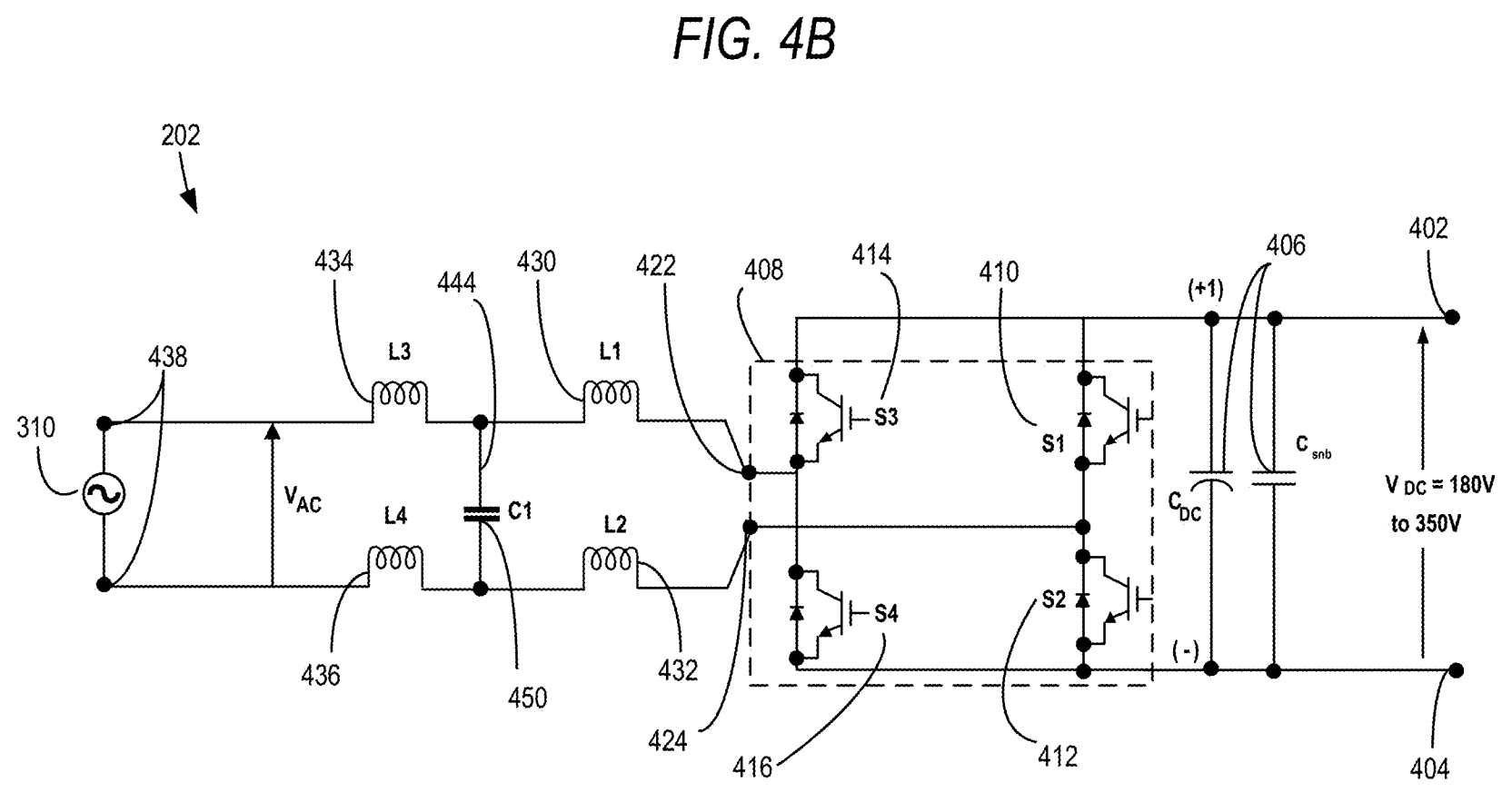
Figure 4C:
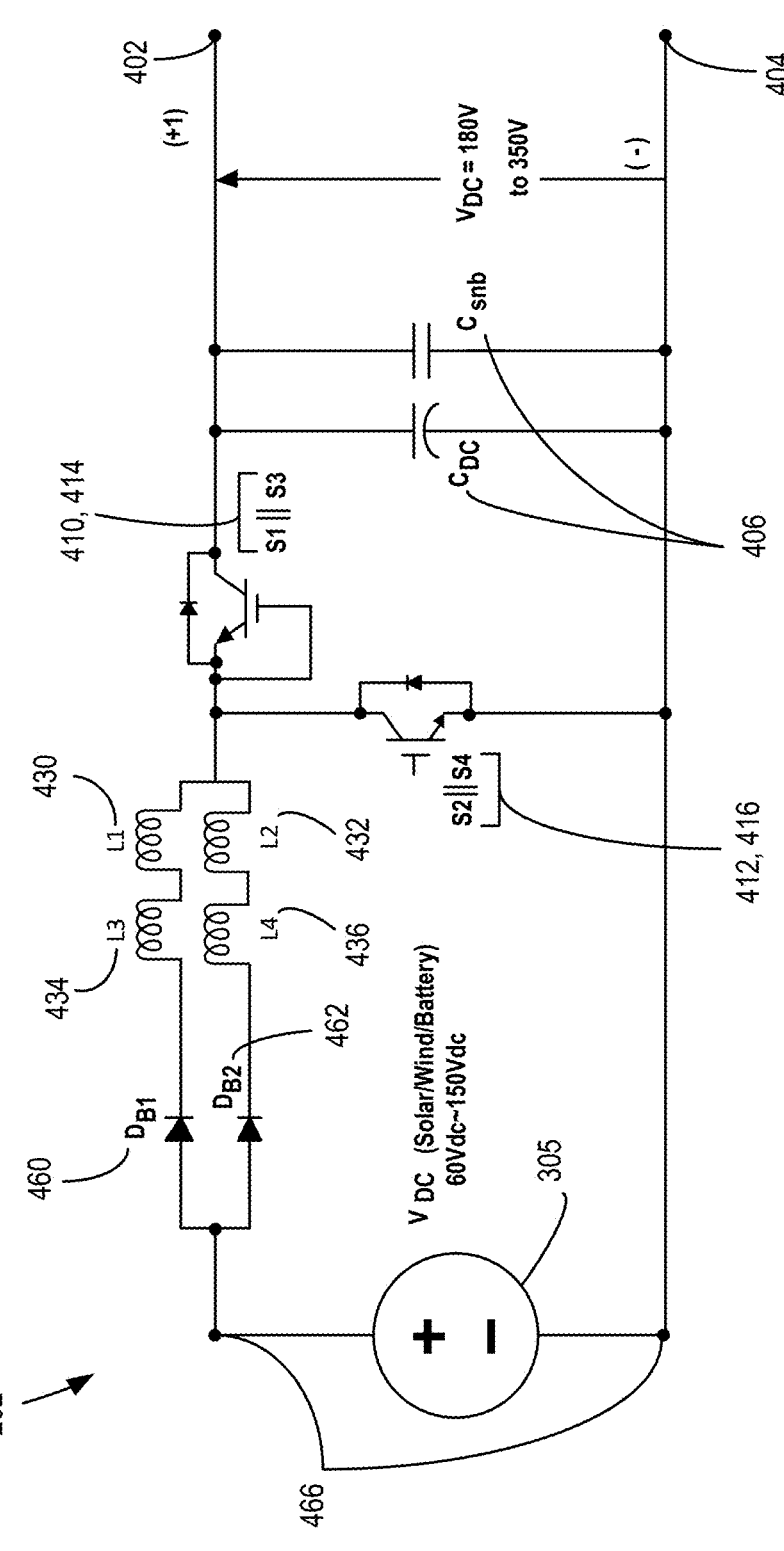
FIG. 4C illustrates a schematic of the front end converter reconfigured to act as a DC-DC boost converter as DC power from a DC power source is applied at the input.

Referring now to FIGS. 4A, 4B, and 4C, a front end converter 202 includes a positive DC connector lead 402 and a negative DC connector lead 404, a pair of DC connector lead capacitors 406 connected in parallel between the DC connector leads 402, 404, a bi-directional inverter 408 including a first switch 410, a second switch 412, a switch 414, and a fourth switch 416. The switches 410, 412, 414, and 416 include, for example, field effect transistors (FETs), metal-oxide-semiconductor FETs (MOSFETs), bi-polar junction transistors (BJTs), or the like. The bi-directional inverter 408 includes two DC connector side leads 418, 420, a positive source side lead 422, a negative source side lead 424, and a negative DC source side lead 426. A boost portion 428 of the active front end converter 202 is connected to the positive source side lead 422 and the negative source side lead 424 of the bi-directional inverter 408. The boost portion 428 includes first, second, third, and fourth inductors 430, 432, 434, 436 in electrical communication with both the positive and negative source side leads 422, 424 of the bi-directional inverter 408. An AC source input 438 of the active front end convert 302 includes positive and negative leads configured to connect to an AC power source 310.

The boost portion 428 includes a first contactor bridge 442 connected between the positive source side lead 422 of the bi-directional inverter and the negative source side lead 424 of the bi-directional inverter 408. The boost portion 428 also includes a second contactor bridge 444 connected between the positive source side lead 422 of the bi-directional inverter and the negative source side lead 424 of the bi-directional inverter 408 and in parallel with the first contactor bridge 442. The first contactor bridge 442 includes a first DC contactor 446 and a first AC contactor 448. The second contactor bridge 444 includes a bridge capacitor 450 and a second DC contactor 452. The first DC contactor 446 is configured to close when DC current flows through the first contactor bridge 442, while the first AC contactor 448 is configured to close in the absence of AC. In this way, when only DC is flowing through the first contactor bridge 442, the positive and negative source side leads 422, 424 of the bi-directional inverter are shorted into a unified DC input lead via first contactor bridge 442.

A second AC contactor 454 is disposed on the positive input lead of the AC source input 438, and a third AC contactor 456 is disponed on the negative input lead of the AC source input 438. These contactors are configured to close when AC current is present on the positive and negative input leads of the AC source input 438. Accordingly, an AC contactor coil 458 is connected between the positive and negative input leads of the AC source input 438, upstream of the second AC contactor 454 and the third AC contactor 456.

Downstream of the second and third AC contactors 454, 456 is a pair of parallel connected diodes 460, 462 that are connected in a reverse biased manner to the positive and negative input leads of the AC source input 438. In some embodiments, a resistive element 464 may also be connected between the positive and negative lead of the AC source input 438. A positive lead of a DC source input 466 is connected in series to the pair of parallel connected diodes 460, 462, and a negative lead of the DC source input 466 is connected to the negative source side lead 424 of the bi-directional inverter 408 and to the negative DC connector lead 404 of the active front end converter 202. A fourth and fifth AC contactor 468, 470 are disposed on the positive and negative leads of the DC source input 466 and configured to close only when AC is not energizing the AC contactor coil 458. The DC contactor coil 472 is connected between the positive and negative input leads of the DC source input 466 and is configured to manipulate the first and second DC contactors 446, 452 when energized by DC.

The strategic placement of the AC contactors 448, 454, 456, 468, DC contactors 446, 452, contactor coils 458, 472, and first, second, third, and fourth switches 410, 412, 414, 416 allow the controller to reconfigure the active front end converter 202 as needed by reacting to the type of power signal input at the AC source input 438 or the DC source input 466 and manipulating the first, second, third, and fourth switches 410, 412, 414, 416 according to the needs for the application.

To ensure safety and robustness of the reconfigurable active front end converter 202, care should be given that the power rating of the reconfigured active front end converter 202 is the same before and after reconfiguration. Since the positive and negative source side leads 422, 424 of the bi-directional inverter 408 are connected in parallel in the reconfigurable topology of the disclosed active front end converter 202, the lowest input DC voltage that is allowable to maintain the power rating of the active front end (AFE) converter 202 may be calculated as follows:

$$VA_{AFE} = V_{AC(nom)} \cdot I_{AC(nom)} \qquad (1)$$

$$VA_{AFE} = P_{DC-DC} = V_{dc(eq)} \cdot I_{DC(eq)} \qquad (2)$$

$$I_{DC(eq)} = 2 \cdot \frac{2 \cdot \sqrt{2} \cdot I_{AC(nom)}}{\pi} \qquad (3)$$

$$\therefore V_{DC(eq)} = \frac{V_{AC(nom)} \cdot I_{AC(nom)}}{I_{DC(eq)}} = \qquad (4)$$

$$\frac{\pi \cdot V_{AC(nom)} \cdot I_{AC(nom)}}{4 \cdot \sqrt{2} \cdot I_{AC(nom)}} = \frac{\pi \cdot V_{AC(nom)}}{4 \cdot \sqrt{2}} = 0.555 \cdot V_{AC(nom)}$$

For Example, if $V_{AC(nom)}$ is 120V, then the equivalent DC voltage of the reconfigured active front end (AFE) converter 202 is computed to be 66.64V DC. Since the input AC voltage can go down to 90% of its nominal value, the lowest DC voltage acceptable for a 120V AC system is 60V DC.

One reason for keeping the power rating the same is to ensure that the voltage and current stress levels on the DC bus to be consistent for the AFE converter 202 regardless of AC or DC input. This includes the voltage and ripple current handling capacity of the DC bus capacitors 406 and the voltage and current rating of the switches 410, 412, 414, 416. In some embodiments, the negative DC power source side lead 426 being brought out from the negative bus of the AFE converter 202 should be rated to handle two times the dc equivalent of the nominal AC current (rms value) from equation (3).

The active front end converter 202 reconfigures to function as an AC-DC inverter, as shown in FIG. 4B, when an AC power source 310 is applied to the positive and negative leads of the AC source input 438. The AC contactor coil 458 is energized by an AC signal from the AC power source 310, causing the second and third AC contactors 454, 456 to close. AC current is thereby allowed to flow toward the positive and negative source side leads 422, 424 of the bi-directional inverter 408. The first contactor bridge 442 is open (i.e., non-conductive) because the first AC contactor 448 opens in response to the AC contactor coil 458 being energized, while the second contactor bridge 444 conducts a flow of AC current therethrough because the second DC contactor 452 is closed. AC power is allowed to flow across the positive and negative AC inputs of the bi-directional inverter 408 while the pair of parallel connected diodes 460, 462 block AC current from flowing to the DC source input 466. The controller 200 manipulates the first, second, third, and fourth switches 410, 412, 414, 416 to rectify the AC signal and produce a DC signal on the positive and negative DC connector leads 402, 404 of the active front end converter 202. The pair of DC connector lead capacitors 406 connected in parallel between the positive and negative DC connector leads 402, 404 assist in holding the output of the bi-directional inverter 408 at a constant voltage. Accordingly, the output of the active front end converter 202 is a boosted voltage DC power signal and may be modulated by the controller 200 via the switches 410, 412, 414, 416 for adaptive charging of a battery (e.g., the internal power source 20).

The active front end converter 202 reconfigures to function as an DC-DC converter, as shown in FIG. 4C, when a DC power source 305 is applied to the positive and negative leads of the DC source input 466. The DC power source 305 applied to the positive and negative leads of the DC source input 466 energizes the DC contactor coil 472 and causes the first DC contactor 446 to close. The closing of the first DC contactor 446 shorts the positive and negative source side leads 422, 424 of the bi-directional inverter 408 together, creating a unified positive DC input lead. In the embodiment shown, the DC power flows through the shorted source side leads 422, 424 to the first, second, third, and fourth switches 410, 412, 414, 416, which are manipulated by the controller 200 as a DC-DC boost converter, to produce a boosted voltage DC signal. The first and third switches 410, 414 are connected in parallel, and the second and fourth switches 412, 414 are connected in parallel. The pair of DC connector lead capacitors 406 connected in parallel between the positive and negative DC connector leads 402, 404 assist in holding the output of the bi-directional inverter 408 at a constant voltage. The boosted voltage DC signal may be modulated by the controller 200 via the switches 410, 412, 414, 416 for adaptive charging of a battery (e.g., the internal power source 20).

Figure 5:
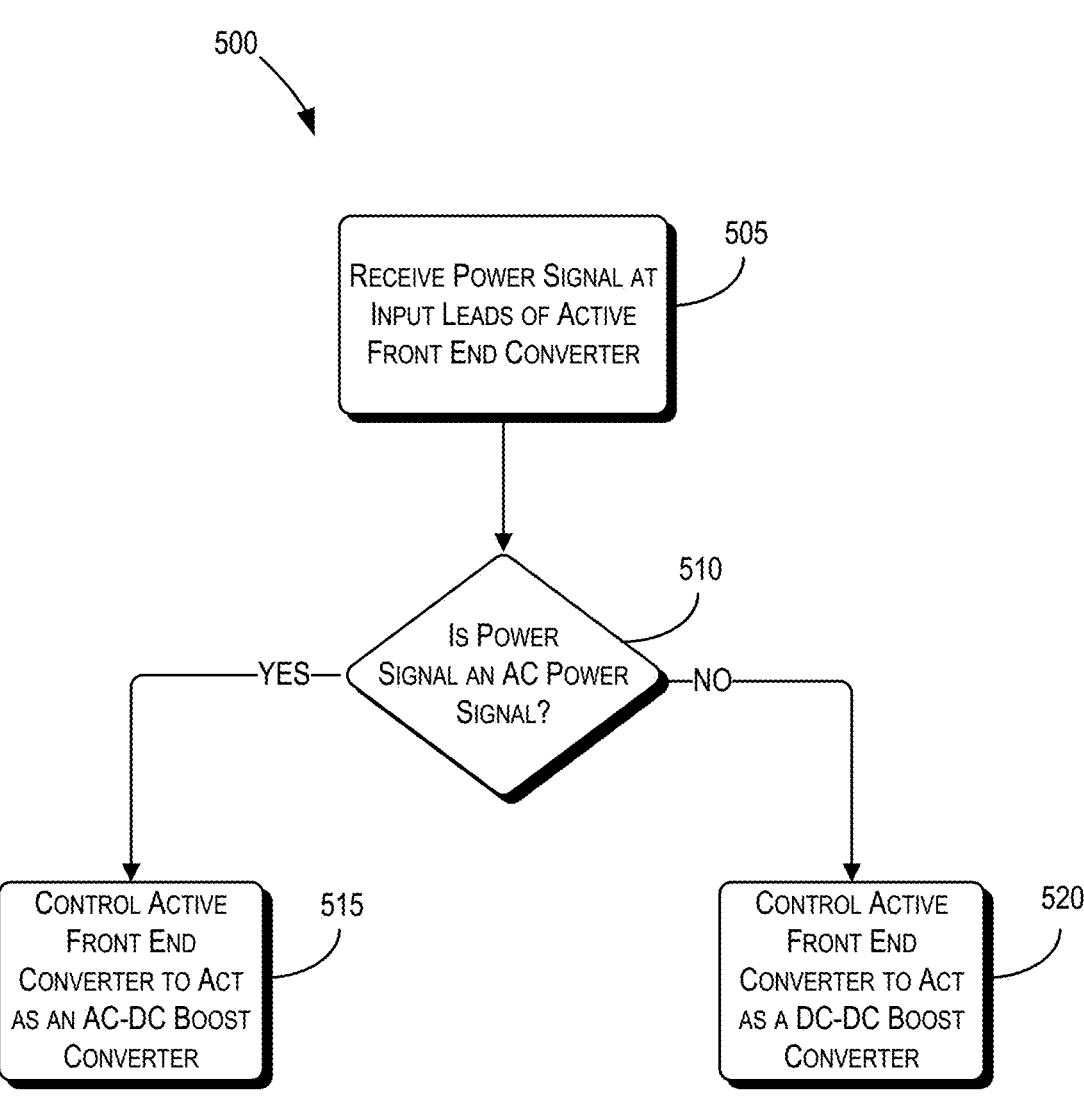
FIG. 5 illustrates a flowchart for reconfiguring and controlling the active front end converter of FIG. 4A based on an input power signal.

FIG. 5 illustrates a flowchart 500 for reconfiguring and controlling the active front end converter 202 based on an input power signal.

At block 505, an AC or DC power signal is received at the positive and negative source side leads 422, 424 of the active front end converter 202.

At block 510, the active front-end converter 202 determines (e.g., contactor coils 458, 472) whether the power signal received at the active front end converter 202 is an AC or DC signal. When the power signal is AC, the process moves to block 515.

At block 515, the contactors 442, 444, 446, 454, 456, 468, 470 are controlled to reconfigure the active front end converter 202 as an AC-DC converter. Specifically, the first AC contactor coil 458 closes the contactors 454, 456, and opens the contactors 468, 470, and 448. AC power flows across the positive and negative source side leads 422, 424 of the bi-directional inverter 408 while the pair of parallel connected diodes 460, 462 block AC current from flowing to the DC source input 466. The controller 200 manipulates the first, second, third, and fourth switches 410, 412, 414, 416 to rectify the AC signal and produce a DC signal on the positive and negative internal power source leads 402, 404 of the active front end converter 202. However, when the power signal is DC, the process moves to block 520.

At block 520, the contactors 442, 444, 446, 454, 456, 468, 470 are controlled to reconfigure the active front end converter 202 as a DC-DC converter. Specifically, the DC contactor coil 472 closes the contactor 446 and opens the contactor 452. The closing of the first DC contactor 446 shorts the positive and negative AC power source side leads 422, 424 of the bi-directional inverter 408 together, creating a unified positive DC input lead. DC power flows through the shorted AC input leads 422, 424 to the first, second, third, and fourth switches 410, 412, 414, 416, which are manipulated by the controller 200 as a DC-DC boost converter, to produce a boosted voltage DC signal. When AC power is provided at the AC source input 438, the AC input is automatically prioritized since the AC contactor coil 458 automatically closes the contactors 468, 470 preventing the energization of the DC contactor coil 472.

Thus, embodiments described herein provide, among other things, a reconfigurable active front end converter circuit. Various features and advantages are set forth in the following claims.

What is claimed is:

1. A portable power supply comprising:

an internal power source;

an alternating-current (AC) input;

a direct-current (DC) input;

an AC output; and an active front-end converter including a bi-directional inverter including a plurality of switches connected in a bridge configuration between a first side leads and a second side leads, the bi-directional inverter configured to electrically connect to the internal power source, the AC input, the DC input, and the AC output using the first side leads and the second side leads, the active front-end configured to convert DC power received at the second side leads from the internal power source to AC power at the first side leads provided at the AC output in a first configuration;

convert AC power received at the first side leads from the AC input to DC power at the second side leads for charging the internal power source in a second configuration; and convert DC power received at the first side leads at a first voltage level from the DC input to DC power at a second voltage for charging the internal power source in a third configuration, wherein the active front-end converter further comprises:

a first inductor connected between the AC input and a contactor bridge; and a second inductor connected between the AC input and the contactor bridge, the second inductor connected in parallel with the first inductor.

2. The portable power supply of claim 1, wherein the active front-end converter further comprises:

an AC contactor coil connected between a positive terminal and a negative terminal of the AC input and configured to place the active front-end converter in the second configuration when the AC contactor coil is energized by an AC current and place the active front-end converter in the third configuration when the AC contactor coil is not energized.

3. The portable power supply of claim 2, wherein the active front-end converter further comprises source side leads connected to the AC input using AC contactors and connected to the DC input using DC contactors, wherein the AC contactors are closed to connect the AC input to the source side leads when the AC contactor coil is energized and the DC contactors are closed to connect the DC input to the source side leads when the AC contactor coil is not energized.

4. The portable power supply of claim 3, wherein the source side leads include a positive source side lead and a negative source side lead, wherein the active front-end converter further comprises a second contactor bridge connected the positive source side lead and the negative source side lead, the second contactor bridge includes a third bridge contactor and a fourth bridge contactor.

5. The portable power supply of claim 4, wherein the active front-end converter further comprises a DC contactor coil connected between a positive terminal and a negative terminal of the DC input, wherein the first bridge contactor is configured to close when the DC contactor coil is energized by a DC current and the second bridge contactor is configured to close when the AC contactor coil is not energized by the AC current, wherein the source side leads are connected when the first bridge contactor and the second bridge contactor are closed.

6. The portable power supply of claim 5, wherein the contactor bridge is connected between the positive source side lead and the negative source side lead and in parallel with the contactor bridge, the contactor bridge including a capacitor.

7. The portable power supply of claim 6, wherein the active front-end converter further comprises:

a first inductor connected between the contactor bridge and the second contactor bridge; and a second inductor connected between the contactor bridge and the second contactor bridge, the second inductor connected in parallel with the first inductor.

8. An active front end converter comprising:

an alternating-current (AC) input;

a direct-current (DC) input;

an AC output;

a DC connector; and an active front-end converter including a bi-directional inverter including a plurality of switches connected in a bridge configuration between a first side leads and a second side leads, the bi-directional inverter configured to electrically connect to the AC input, the DC input, the AC output, and the DC connector using the first side leads and the second side leads, the active front-end configured to convert DC power received at the second side leads from the DC connector to AC power at the first side leads provided at the AC output in a first configuration;

convert AC power received at the first side leads from the AC input to DC power at the second side leads provided at the DC connector in a second configuration; and convert DC power received at the first side leads at a first voltage level from the DC input to DC power at a second voltage provided at the DC connector in a third configuration, wherein the active front-end converter further comprises:

a first inductor connected between the AC input and a contactor bridge; and a second inductor connected between the AC input and the contactor bridge, the second inductor connected in parallel with the first inductor.

9. The active front end converter of claim 8, further comprising:

an AC contactor coil connected between a positive terminal and a negative terminal of the AC input and configured to place the active front-end converter in the second configuration when the AC contactor coil is energized by an AC current and place the active front-end converter in the third configuration when the AC contactor coil is not energized.

10. The active front end converter of claim 9, further comprising:

source side leads connected to the AC input using AC contactors and connected to the DC input using DC contactors, wherein the AC contactors are closed to connect the AC input to the source side leads when the AC contactor coil is energized and the DC contactors are closed to connect the DC input to the source side leads when the AC contactor coil is not energized.

11. The active front end converter of claim 10, wherein the source side leads include a positive source side lead and a negative source side lead, the active front end converter further comprising:

a second contactor bridge connected the positive source side lead and the negative source side lead, the second contactor bridge includes a first bridge contactor and a second bridge contactor.

12. The active front end converter of claim 11, further comprising:

a DC contactor coil connected between a positive terminal and a negative terminal of the DC input, wherein the first bridge contactor is configured to close when the DC contactor coil is energized by a DC current and the second bridge contactor is configured to close when the AC contactor coil is not energized by the AC current, wherein the source side leads are connected when the first bridge contactor and the second bridge contactor are closed.

13. The active front end converter of claim 12, wherein the contactor bridge is connected between the positive source side lead and the negative source side lead and in parallel with the second contactor bridge, the contactor bridge including a capacitor.

14. The active front end converter of claim 13, further comprising:

a first inductor connected between the contactor bridge and the second contactor bridge; and a second inductor connected between the contactor bridge and the second contactor bridge, the second inductor connected in parallel with the first inductor.

* * * * *